April 21, 1964

R. D. BORGERSEN 3,129,582

PORTABLE HARDNESS TESTER

Filed Feb. 20, 1963

INVENTOR.
ROLAND D. BORGERSEN
BY
*John F. A. Earley*
ATTORNEY

April 21, 1964

R. D. BORGERSEN 3,129,582

PORTABLE HARDNESS TESTER

Filed Feb. 20, 1963

INVENTOR.
ROLAND D. BORGERSEN
BY
John F. A. Earley
ATTORNEY

United States Patent Office 3,129,582
Patented Apr. 21, 1964

3,129,582
PORTABLE HARDNESS TESTER
Roland D. Borgersen, Wynnewood, Pa., assignor to King Tester Corporation, Philadelphia, Pa., a corporation of Pennsylvania
Filed Feb. 20, 1963, Ser. No. 259,962
3 Claims. (Cl. 73—81)

This invention relates to improvements in a portable hardness tester, and more particularly concerns a hydraulically operated tester having a test head which is light in weight and has its elements compactly arranged.

Portable hardness testers for testing the Brinell hardness of various metals have heretofore been made and used. Patent No. 2,297,778 which issued to Horace C. Knerr and Andrew King on October 6, 1942, for a Brinell Hardness Testing Machine discloses such a device. The Knerr and King tester was successful in compressing all the elements for hydraulic operation into a small test head, but it has long had the problem (FIG. 5) of leakage past the valve seats 88 and 97 which are inserted one above the other in the lower end of pressure release valve chamber 54. Moreover, in the assembly of the test head, inserting these valve seats presented considerable difficulty.

Accordingly, it is an object of this invention to provide a test head which overcomes the foregoing problems and disadvantages.

Other objects and advantages of this invention, including its simplicity and economy, as well as the ease with which it may be adapted for use with existing equipment, will further become apparent hereinafter and in the drawings, in which.

Figure 3:
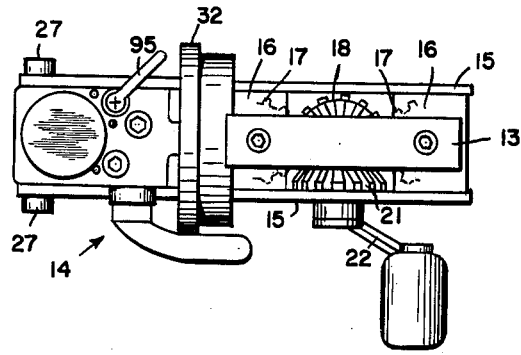
FIG. 3 is a view in top plan of the tester of FIG. 1.
Figure 1:
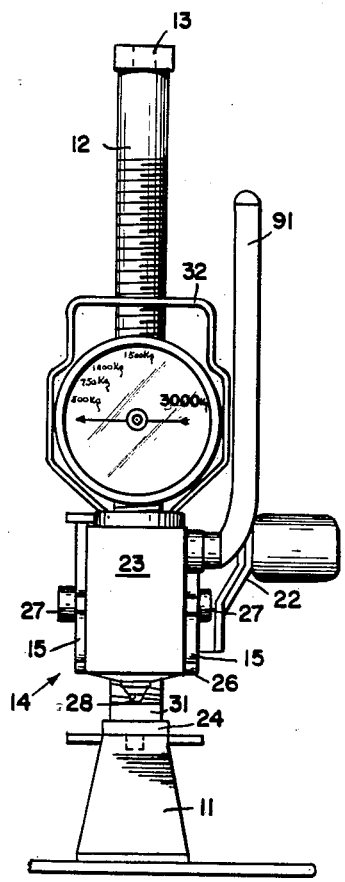
FIG. 1 is a view in section of a hardness tester constructed in accordance with this invention.

Although specific terms are used in the following description for clarity, these terms are intended to refer only to the structure shown in the drawings and are not intended to define or limit the scope of the invention.

Turning now to the specific embodiment of the invention selected for illustration in the drawings, there is shown a portable hardness tester which includes a base 11 which supports a pair of upstanding posts or screws 12 that are connected together at the top by horizontal strap 13. Strap 13 helps maintain the screws 12 in parallelism and also acts as a handle by which the entire tester may be carried.

A carriage 14 is mounted for vertical movement on the two screws 12. Carriage 14 includes two parallel side plates 15 which are connected together by blocks 16 which support gears 17 that mesh with screws 12. Gears 17 are driven by a gear 18 which meshes with a bevel gear 21 that is driven by a crank 22. By turning crank 22, the gears 17 are moved along screws 12 and the carriage 14 is raised or lowered as desired.

The fore ends of side plates 15 are spaced apart sufficiently to receive a test head 23 which is arranged in a predetermined position over anvil 24 (supported on base 11) by means of the arced surfaces 25 which engage the arced ears 26 that extend from the sides of test head 23. Screws 27 hold the side plates 15 against test head 23.

As is apparent from the drawings, the arcs defining the surfaces 25 and the corresponding surfaces of ears 26 are struck from an axis which includes the center of ball 28 (carried by head 23), and extends normal to the path of movement of ball 28, whereby forces acting through the surfaces 25, when the machine is in use, are kept substantially radial with respect to ball 28, and lateral thrust due to off-center application of pressure (and inaccurate test readings resulting therefrom) is thereby minimized.

When a test piece 31 is placed between ball 28 and anvil 24, the machine may be operated to determine its hardness.

Test head 23 may be removed from carriage 14 by loosening the two screws 27 and lifting the head out from between the side plates 15 by its handle 32.

The test head 23 has a unitary test block 33 having a pump 34, a pressure relief valve 35, and a pressure release valve 36. A gauge 37 is mounted on block 33 and indicates the pressure being applied to the test piece.

Block 33 has formed therein a ram cylinder 38, a pump cylinder 41, a relief valve chamber 42, and a pressure release valve chamber 43.

An oil sump 44 (which may contain any hydraulic fluid) is provided by a cuplike casing 45 which is press-fitted into ram cylinder 38. The upper part of casing 45 has a flange 46 which makes oil-tight contact with the walls of ram cylinder 38.

The upper end of ram cylinder 38 is threaded to receive a retaining nut 47 which bears against the upper surface of flange 46 to lock casing 45 in place. A flexible, fluid-proof sac 48 is positioned in oil sump 44 and is held in place by a threaded washer 51 which engages the thread on the inner wall of retaining nut 47. Elastic sac 48 prevents oil from escaping from sump 44 and expands and contracts under varying oil conditions within sump 44. A cap 52 is threaded into retaining nut 51.

Casing 45 has only one exit port 53 leading away from sump 44, and has only one return port 54 leading back into sump 44. Ports 53 and 54 are spaced apart by about 95° on oil sump casing 45 in order to inhibit leakage therebetween.

A cuplike ram 55 is positioned in ram cylinder 38 and has a ram pressure chamber 56 formed between the interior of ram 55 and the exterior of oil sump casing 45.

A low pressure valve 57 has a valve chamber 58 formed in block 33, and includes an entrance port 61 with a ball check 62 urged toward closed position by one end of a spring 63 which has its other end abutting a screw 64 that is threaded into the outside wall of block 33. Exit port 53 of sump 44 is connected to entrance port 61 of low pressure valve 57 by a passageway including duct 65 and vertical duct 66.

Low pressure valve chamber 58 is connected to pump cylinder 41 by a pump passageway including vertical duct 67.

A high pressure valve 68 having a chamber 71 is formed in block 33 and is provided with an entrance port 72 with a ball check 73 urged toward closed position by one end of a spring 74 which has its other end abutting a screw 75 threaded into the outside wall of block 33.

A passageway including duct 77 connects low pressure valve chamber 58 to the entrance port 72 of high pressure valve 68, whereby oil is adapted to be pumped from pump cylinder 41 into the low pressure valve chamber 58 and then through duct 77 to the high pressure valve 68. It is to be noted that the axis of the high pressure valve 68 is 90° from the axis of low pressure valve 57, and that the passageway which leads from the high pressure valve chamber 71 to gauge 37 includes a duct 78 which is horizontally positioned and which is 90° from the axis of high pressure valve chamber 71 and is parallel to the axis of low pressure valve chamber 58. This makes for easy drilling of the valve chambers and ducts, since all except one are normal to the surface of the outside wall of block 33 from which they are drilled.

High pressure valve chamber 71 is connected: to pressure relief valve 35 through a passageway including vertical duct 81, to pressure release valve 36 by a passageway including horizontal duct 82, to gauge 37 through a passageway including a horizontal duct 78, and to ram pressure chamber 56 through a passageway including duct 83. A return passageway including a diagonal duct 84 connects the relief and release valve chambers 42, 43 to oil sump 44 through return port 54.

Figure 2:
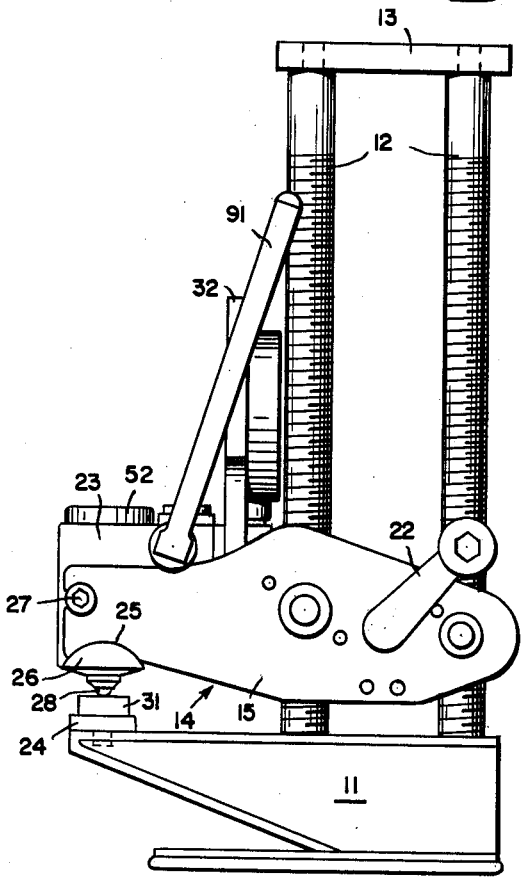
FIG. 2 is a view in side elevation of the hardness tester shown in FIG. 1.
Figure 5:
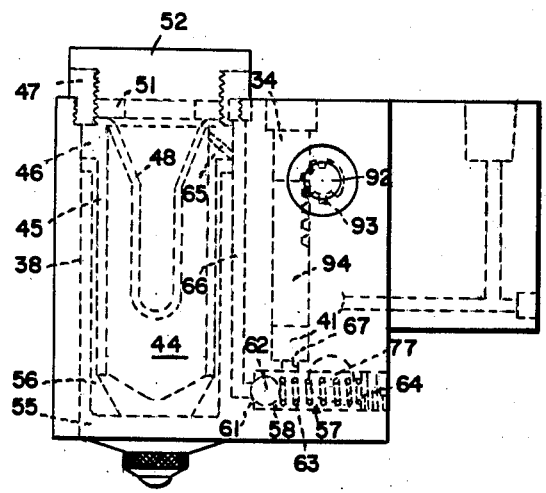
FIG. 5 is a view in elevation of the right side of the test block of FIG. 4.
Figure 6:
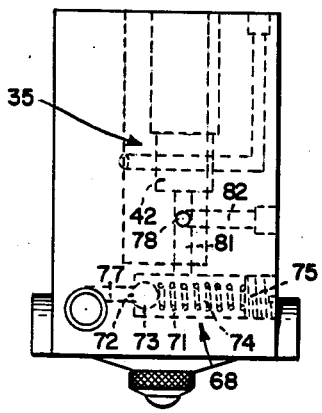
FIG. 6 is a view in rear elevation of the test block of FIG. 4.
Figure 7:
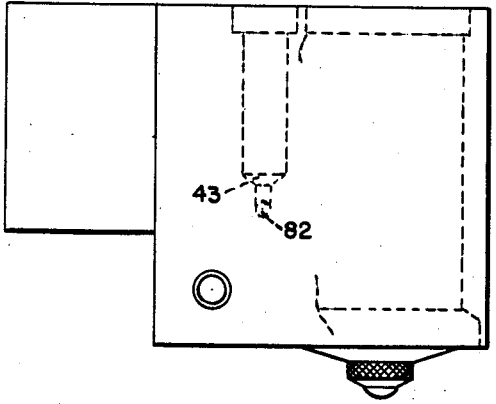
FIG. 7 is a view in side elevation of the left side of the test block of FIG. 4.

Pump 34 (FIG. 2) is provided with a pump handle 91 attached (FIG. 5) to a shaft 92 to which is keyed a segmented gear 93 that meshes with the teeth of pump plunger 94 to move plunger 94 up and down to pump oil out of pump cylinder 41 through duct 67 into low pressure valve chamber 58. When pump plunger 94 is raised, oil is drawn from sump 44 through exit port 53, duct 65, and vertical duct 66 into chamber 58 past ball check 62, and through duct 67 into pump cylinder 41.

Then as plunger 94 is moved downwardly by cranking pump handle 91, the oil trapped within pump cylinder 41 is forced into valve chamber 58. Since ball check 62 is seated because of the pressure of spring 63 and the oil pressure from pump cylinder 41, the oil is forced through duct 77 to entrance port 72 of high pressure valve 68, where the oil pressure forces the oil past ball check 73 into high pressure chamber 71.

The oil that has reached valve chamber 71 cannot reverse its direction of flow because of the action of ball 73 (which seats when the oil pressure from duct 77 diminishes). As a result of continued pumping, the oil flows from valve chamber 71 through vertical duct 81 and horizontal duct 83 into ram pressure chamber 56. As more oil is forced into pressure chamber 56, the pressure is gradually built up therein to more hydraulic ram 55.

Ram pressure chamber 56 is connected to pressure gauge 37, pressure release valve 36, and pressure relief valve 35, so that the oil pressure therein is the same.

Pressure relief valve 35 is preset to open at a given oil pressure and is preferably a spring-controlled ball valve in which the ball is normally seated by the action of a spring-actuated plunger. The tension of the spring may be adjusted by rotating a nut which is threaded into the bore above the spring. When the oil pressure is too high, the ball is forced away from its seat and the oil flows thorugh the relief valve chamber to empty into sump 44 through diagonal duct 84 and return port 54.

Figure 4:
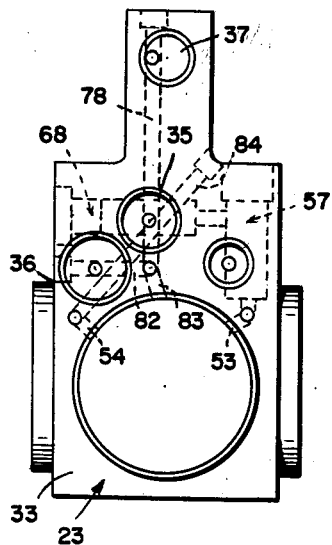
FIG. 4 is a view in top plan on an enlarged scale of the test block of this invention.

Pressure release valve 36 is manually operated (FIG. 3) by turning handle 95 which allows (FIG. 4) the oil in high pressure duct 82 to flow through release valve chamber 43 and diagonal duct 84 to return to sump 44 through return port 54.

In operation of the tester, first the release valve 36 is opened by turning handle 95 and the carriage 14 is raised enough to admit test piece 31 into the space between anvil 24 and ball 28. Test piece 31 is then firmly clamped between ball 28 and anvil 24, making sure that ram 55 is pushed in as far as it goes. Release valve 36 is closed by turning handle 95, and pump operating lever or handle 91 is pumped slowly until full pressure (as shown on gauge 37) has caused relief valve 35 to pop off three or four times. Release valve 36 is then opened, and carriage 14 is raised. The impression made by ball 28 on test piece 31 is a standard Brinell impression and it is read in the usual manner.

Base 11 is made with a narrow, shallow nose at the anvil 24 and it extends beyond the front end of the bottom plate of the base in order to allow tests to be made in small places, tubes, and so forth. This gives the tester unlimited possibilities for quickly making tests in places and on parts heretofore thought too cumbersome or impossible to test. The tester can be operated in many positions, even upside down, and make accurate tests.

For applying lesser loads (i.e., loads less than the maximum setting of relief valve 35), the procedure is to pump the handle 91 to the desired load (as indicated on the dial of gauge 37). Hold for a few seconds, if necessary, then release. The tests are accurate, even though the machine does not pop off automatically at these loads.

For testing parts larger than that which will fit between anvil 24 and ball 28 when using the standard base 11 and carriage 14, the test head 23 may be removed from carriage 14 by removing the screws 27. Then parts of any size may be tested by providing means placed against cap 52 to take the thrust of the load (such as C-clamps, yokes, and so forth).

The test head constructed in accordance with the present invention has many advantages. Its low and high pressure valves are bored from a solid block so that there is no seepage around valve seat inserts, as in previous devices. Moreover, the difficult and tedious job of setting valve seats has been eliminated. The valve seats of previous devices had to be set perfectly, or the oil would escape around the inserts and would lower the oil pressure.

The test head of the present invention is easier to maintain then previous test heads. In previous devices, dirt in the valve cylinders required removal of the valve seats for cleaning. But, the fit of the valve seats was necessarily so close that such removal scored the valve cylinder walls and reduced the pressure of the device when the valve seats were replaced.

The present construction also permits the use of heavier ball-check springs. Accordingly, pressure is built up faster, and there is less backtrack of oil through the ball checks. The stronger springs also enable the tester to better hold the pressure once it is built up. Another reason that the pressure is held better is that there are no valve block inserts and therefore no oil leakage around them.

The test head of the present invention is easier to construct because there are fewer ducts and holes, there are no inserts except springs and ball checks, and tolerances need not be maintained as high as in previous testers.

In previous devices, there were as many as three holes in the ram cylinder wall and they were necessarily placed so close that there was a danger of seepage therebetween. In the present invention, there are only two holes or ports between the sump 44 and the wall of ram cylinder 38 and they are placed about 95° apart so that there is much less chance of seepage.

It is to be noted that the test head of the present invention weighs only about ten pounds so as to be easily portable. Compare this weight with conventional deadweight type machines which apply the load by means of hydraulic pressure but maintain the load with weights. Most of these hardness testers weigh several hundred pounds. Smaller machines do not apply the load gradually, but apply the load by springs or by hammer blow.

It is to be understood that the form of the invention herewith shown and described is to be taken as a presently preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

The claimed invention:

1. In a portable hardness tester, a test head comprising a unitary test block having a pump, pressure relief valve, and pressure release valve, a gauge mounted on said block, said block having a ram cylinder, pump cylinder, relief valve chamber, and release valve chamber formed therein, an oil sump having a cup-like casing positioned in said ram cylinder and having only one exit port and one return port, a flexible sac sealing off the top of said oil lamp, a cup-like ram positioned in said ram cylinder and having a ram pressure chamber formed between the interior of said ram and exterior of said oil sump casing, a low pressure valve having a chamber formed in said block and having an entrance port with a ball check urged toward closed position by one end of a spring which has its other end abutting a screw which is threaded into the outside wall of said block, a passageway connecting the exit port of said sump to the entrance port of said low pressure valve, a pump passageway extending between the low pressure valve chamber and the pump cylinder, a high pressure valve having a chamber formed in said block and having an entrance port with a ball check urged toward closed position by one end of a spring which has its other end abutting a screw which is threaded into the outside wall of said block, a passageway connecting the low pressure valve chamber to the entrance port of the pressure valve whereby oil is adapted to be pumped from the pump cylinder into the low pressure valve chamber and then to the high pressure valve, a passageway connecting the high pressure valve chamber to the pressure relief valve, a passageway connecting the high pressure valve chamber to the pressure release valve, a passageway connecting the high pressure valve chamber to the gauge, a passageway connecting the high pressure valve chamber to the ram pressure chamber, and a diagonal return passageway connecting the relief and release valve chambers to the oil sump through the return port.

2. The device defined in claim 1, wherein the axis of the high pressure valve is 90° from the axis of the low pressure valve, and the passageway from the high pressure valve chamber to the gauge contains a horizontal duct which is 90° from the axis of the high pressure valve chamber and parallel to the axis of the low pressure valve chamber.

3. The device defined in claim 1, wherein the sump exit port and sump return port are spaced apart by about 95° on the oil sump casing to inhibit leakage therebetween.

References Cited in the file of this patent
UNITED STATES PATENTS 2,297,778    Knerr et al. _____ Oct. 6, 1942